US012705696B2

(12) United States Patent
Huang et al.

(10) Patent No.: US 12,705,696 B2

(45) Date of Patent: Aug. 11, 2026

(54) IMAGE DISPLAY METHOD, TERMINAL DEVICE, SERVER, ELECTRONIC DEVICE, STORAGE MEDIUM AND PROGRAM PRODUCT FOR APPLYING DISPLAY EFFECTS

(71) Applicant: TENCENT TECHNOLOGY (SHENZHEN) COMPANY LIMITED, Shenzhen (CN)

(72) Inventors: Yongcheng Huang, Shenzhen (CN); Hongbin Cao, Shenzhen (CN); Sijia Chen, Shenzhen (CN); Jian Cao, Shenzhen (CN); Xiaoxiang Yang, Shenzhen (CN); Jia Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 278 days.

(21) Appl. No.: 18/211,011

(22) Filed: Jun. 16, 2023

(65) Prior Publication Data

US 2023/0334625 A1 Oct. 19, 2023

Related U.S. Application Data

(63) Continuation of application No. PCT/CN2022/135643, filed on Nov. 30, 2022.

(30) Foreign Application Priority Data

Jan. 27, 2022 (CN) ........................ 202210101715.0

(51) Int. Cl.

*G06T 5/00* (2024.01)
*A63F 13/355* (2014.01)
*A63F 13/52* (2014.01)

(52) U.S. Cl.

CPC .............. *G06T 5/00* (2013.01); *A63F 13/355* (2014.09); *A63F 13/52* (2014.09);

(Continued)

(58) Field of Classification Search

CPC ............ G06T 2207/10016; G06T 5/00; G06T 2207/20208; G06T 2207/10024;

(Continued)

(56) References Cited

U.S. PATENT DOCUMENTS

2012/0162277 A1* 6/2012 Lin .......................... G09G 5/14 345/204
2015/0154934 A1* 6/2015 Spitzer .................. G09G 5/003 345/618

(Continued)

FOREIGN PATENT DOCUMENTS

CN 104683734 A 6/2015
CN 106215418 A 12/2016

(Continued)

*Primary Examiner* — Justin L Myhr

(74) *Attorney, Agent, or Firm* — Sughrue Mion, PLLC

(57) ABSTRACT

The disclosure provides an image display method including: obtaining an adjustment ability of an image parameter in a terminal device, the adjustment ability of the image parameter being used for indicating the image parameter capable of being adjusted in the terminal device; obtaining first data of an image of a first application; and based on the first data including M first parameters and parameter values of the M first parameters, adjust parameter values of M second parameters, respectively, and based on the adjusted parameter values of the M second parameters, display the image of the first application; where the first parameter is an image parameter of the first application indicated by the adjustment ability; and the first parameters have one-to-one correspon- (Continued)

200

Obtain an adjustment ability of an image parameter in a terminal device, and the adjustment ability of the image parameter is used for indicating the image parameter capable of being adjusted in the terminal device — S201

Transmit a first request to a cloud server, and the first request is used for requesting to obtain the first data of the image of the first application — S202

Receive the first data of the image of the first application transmitted by the cloud server — S203

Determine whether the first data includes M first parameters, the first parameter is an image parameter of the first application indicated by the image parameter adjustment ability in the terminal device, for controlling a display effect of the image of the first application, and M≥1 — S204

In a case that the first data includes the M first parameters, based on parameter values of the M first parameters, adjust parameter values of M second parameters, respectively, and based on the adjusted parameter values of the M second parameters, display the image of the first application — S205 dence to the second parameters, and an adjustment range of the second parameters includes the parameter values of the first parameters.

20 Claims, 6 Drawing Sheets

(52) U.S. Cl.
CPC .................... *G06T 2200/16* (2013.01); *G06T 2207/10016* (2013.01); *G06T 2207/10024* (2013.01); *G06T 2207/20208* (2013.01)

(58) Field of Classification Search
CPC .... G06T 2200/16; A63F 13/355; A63F 13/52; A63F 13/77
See application file for complete search history.

(56) References Cited

U.S. PATENT DOCUMENTS

2017/0312626 A1* 11/2017 Colenbrander ......... A63F 13/35
2019/0342555 A1* 11/2019 Dimitrov .............. G06F 9/4856
2021/0049966 A1* 2/2021 Hsu .......................... G09G 5/10
2021/0250547 A1* 8/2021 Jiang ................ H04N 21/25825
2022/0328015 A1* 10/2022 Sun ...................... G09G 3/3406

FOREIGN PATENT DOCUMENTS

CN 107807852 A 3/2018
CN 109753207 A 5/2019
CN 111176758 A 5/2020

* cited by examiner

100

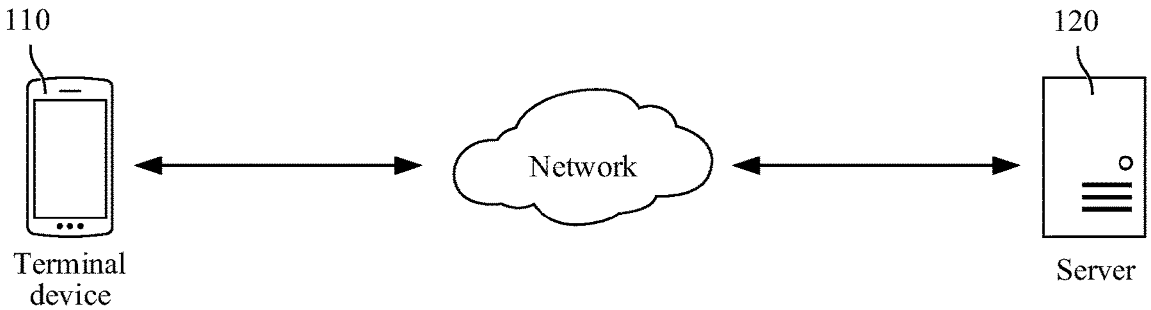

Obtain an adjustment ability of an image parameter in a terminal device, and the adjustment ability of the image parameter is used for indicating the image parameter capable of being adjusted in the terminal device — S201

↓

Transmit a first request to a cloud server, and the first request is used for requesting to obtain the first data of the image of the first application — S202

↓

Receive the first data of the image of the first application transmitted by the cloud server — S203

↓

Determine whether the first data includes M first parameters, the first parameter is an image parameter of the first application indicated by the image parameter adjustment ability in the terminal device, for controlling a display effect of the image of the first application, and $M \geq 1$ — S204

↓

In a case that the first data includes the M first parameters, based on parameter values of the M first parameters, adjust parameter values of M second parameters, respectively, and based on the adjusted parameter values of the M second parameters, display the image of the first application — S205

FIG. 5

IMAGE DISPLAY METHOD, TERMINAL DEVICE, SERVER, ELECTRONIC DEVICE, STORAGE MEDIUM AND PROGRAM PRODUCT FOR APPLYING DISPLAY EFFECTS

CROSS REFERENCE TO RELATED APPLICATIONS

This application is a continuation application of International Patent Application No. PCT/CN2022/135643 filed on Nov. 30, 2022, which claims priority to Chinese Patent Application No. 202210101715.0, filed with the China National Intellectual Property Administration on Jan. 27, 2022, the disclosures of which are incorporated by reference in their entireties.

FIELD

Embodiments of the disclosure relates to the field of application basic technologies in the application technology, and in particular, to an image display method, a terminal device, a server, an electronic device, a storage medium and a program product.

BACKGROUND

In related art, a game mode in a terminal image mode is implemented by setting a set of fixed parameter values for terminal image parameters, where common parameters include: brightness, contrast, chroma, color temperature, gamma, sharpness and other options, as well as the selection of motion compensation, noise reduction and other function switches. The parameter values of the set of parameters are generally adapted to most games.

However, the parameter values set for all games in the game mode are the same, rendering certain limitations on game display, and it cannot be adapted to all games. For example, the game mode has parameter values such as reducing brightness and increasing sharpness. When the parameter values of these parameters are applied to some game pictures with complex scenes and obvious edges, improving the sharpness would easily make the scenes very sharp, rendering messy pictures and reducing a user's game experience. When applied to some games with dark pictures, reducing the brightness would also cause the pictures to be gray and dark and the details of the pictures cannot be seen clearly.

SUMMARY

Embodiments of the disclosure provide an image display method, a terminal device, a server, an electronic device, a computer-readable storage medium and a computer program product, which can enable the terminal device to flexibly adjust M second parameters for a first application, improving a display effect of the image of the first application.

The embodiments of the disclosure provide an image display method, adapted to a terminal device, and including:

obtaining an adjustment ability of an image parameter in a terminal device, the adjustment ability of the image parameter being used for indicating the image parameter capable of being adjusted in the terminal device;

obtaining first data of the image of a first application transmitted by a cloud server;

based on the first data includes M first parameters, based on parameter values of the M first parameters, adjusting parameter values of M second parameters, respectively, and based on the adjusted parameter values of the M second parameters, displaying the image of the first application;

the first parameter being an image parameter of the first application indicated by the adjustment ability for controlling a display effect of the image of the first application;

and the first parameters having one-to-one correspondence to the second parameters, an adjustment range of the second parameters including the parameter values of the first parameters, and the M being greater than or equal to 1.

The embodiments of the disclosure further provide an image display method, applied to a cloud server, and including:

obtaining an adjustment ability of an image parameter in a terminal device, and obtaining first data of an image of a first application;

the adjustment ability of the image parameter being used for indicating the image parameter capable of being adjusted in the terminal device; and transmitting, based on the first data includes M first parameters, the first data of the image of the first application to the terminal device;

the first parameter being an image parameter of the first application indicated by the adjustment ability for controlling a display effect of the image of the first application;

and parameter values of the M first parameters being used for the terminal device to adjust parameter values of M second parameters, and based on the adjusted parameter values of the M second parameters, displaying the image of the first application;

the first parameters having one-to-one correspondence to the second parameters, an adjustment range of the second parameters including the parameter values of the first parameters, and the M being greater than or equal to 1.

The embodiments of the disclosure provide a terminal device, including:

an obtaining unit, configured to obtain an adjustment ability of an image parameter in a terminal device, the adjustment ability of the image parameter being used for indicating the image parameter capable of being adjusted in the terminal device;

the obtaining unit, configured to obtain first data of an image of a first application; and an adjustment unit, configured to based on the first data includes M first parameters, based on parameter values of the M first parameters, adjust parameter values of M second parameters, respectively, and based on the adjusted parameter values of the M second parameters, display the image of the first application; the M first parameters being used for controlling a display effect of the image of the first application, the first parameter being the image parameter of the first application indicated by the adjustment ability; the first parameters having one-to-one correspondence to the second parameters, an adjustment range of the second parameters including the parameter values of the first parameters, and the M being greater than or equal to 1.

The embodiments of the disclosure provide a server, including:

an obtaining unit, configured to obtain an adjustment ability of an image parameter in a terminal device, and obtain first data of an image of a first application;

the adjustment ability of the image parameter being used for indicating the image parameter capable of being adjusted in the terminal device; and a transmitting unit, configure to based on the first data includes M first parameters, transmit the first data to the terminal device;

the first parameter being an image parameter of the first application indicated by the adjustment ability for controlling a display effect of the image of the first application; and parameter values of the M first parameters being used for the terminal device to adjust parameter values of M second parameters, and based on the adjusted parameter values of the M second parameters, displaying the image of the first application;

the first parameters having one-to-one correspondence to the second parameters, an adjustment range of the second parameters including the parameter values of the first parameters, and the M being greater than or equal to 1.

The embodiments of the disclosure provide an electronic device, including:

a processor being configured to execute a computer program; and a computer-readable storage medium storing the computer program, and when the computer program being executed by the processor, implementing the foregoing image display method provided by the embodiments of the disclosure.

The embodiments of the disclosure provide a computer-readable storage medium, configured to store a computer program, the computer program enabling a computer to execute the foregoing image display method provided by the embodiments of the disclosure.

The embodiments of the disclosure provide a computer program product, including a computer program or an instruction, when the computer program or the instruction being executed by a processor, implementing the foregoing image display method provided by the embodiments of the disclosure.

The technical solutions provided in the embodiments of the disclosure can achieve the following beneficial effects:

when first data includes M first parameters capable of being adjusted as indicated by an adjustment ability of image parameters in a terminal device, based on parameter values of the M first parameters, adjusting parameter values of second parameters corresponding to each first parameter in the terminal device, respectively. On one hand, since the first parameters are adjustable image parameters, and an adjustment range of the second parameters includes the parameter values of the first parameters, it ensure the M second parameters capable of being adjusted in the terminal device. On the other hand, since the parameter values of the second parameters are adjusted according to the parameter values of the first parameters, the fixed parameter values of M second parameters in the terminal device for different first applications (such as cloud gaming applications) can avoid a problem of poor image display and a poor user experience of some applications. At the same time, by using the M first parameters for controlling a display effect of an image of the first application, adjust the parameter values of the M second parameters in the terminal device, which enables the terminal device to improve the display effect of the image of the first application, so as to improve the user experience.

BRIEF DESCRIPTION OF THE DRAWINGS

FIG. 4 is a schematic diagram of a scene according to some embodiments of the disclosure.

FIG. 5 is a schematic flowchart of an image display method according to some embodiments of the disclosure.

DETAILED DESCRIPTION

Figure 1:
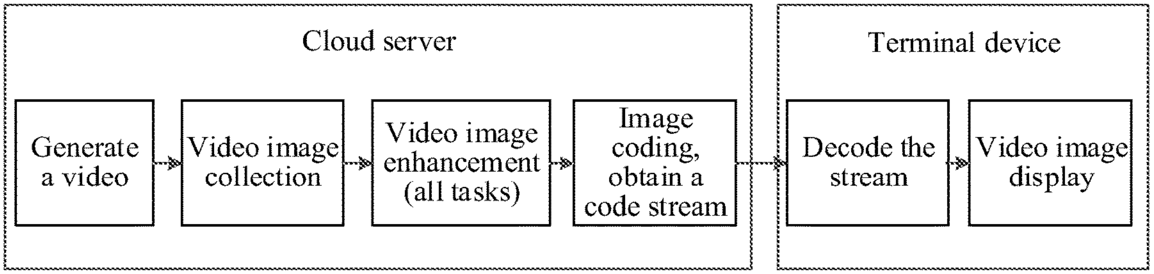
FIG. 1 is a flowchart of an image processing process according to some embodiments of the disclosure.

The technical solutions in embodiments of the disclosure are clearly and completely described below with reference to the accompanying drawings in the embodiments of the disclosure. Apparently, the described embodiments are merely some rather than all of the embodiments of the disclosure. All other embodiments obtained by a person skilled in the art on the basis of the embodiments of the disclosure without making creative efforts shall fall within the protection scope of the disclosure.

In the following description, "some embodiments" are involved, which describe a subset of all possible embodiments, but it is understandable that "some embodiments" may be the same subset or different subset of all possible embodiments, and may be combined with each other without conflict.

Embodiments of the disclosure relate to the field of application basic technologies in the application technology. For example, the embodiments of the disclosure relate to the field of cloud gaming technologies.

A cloud gaming, also known as gaming on demand, is an online gaming technology on the basis of a cloud computing technology. The cloud gaming technology enables thin clients with relatively limited graphics processing and data computing abilities to run high-quality games. In a cloud gaming scene, a game does not run in a player's game terminal, but in a cloud server. The cloud server renders the game scene into a video and audio stream, which is transmitted to the player's game terminal through the network. The player's game terminal does not need to have powerful graphics computing and data processing abilities, but only needs basic streaming media playing abilities and abilities of obtaining a player input instruction and transmitting the player input instruction to the cloud server.

The embodiments of the disclosure may also relate to network media technologies, which, unlike a conventional audio and video device, relies on a technology and an device provided by a developer of Information Technology (IT)

equipment to transmit, store and process an audio and video signal. A conventional Serial Digital Interface (SDI) transmission mode lacks real network switching characteristics, and it needs a lot of work to create part network functions provided by similar Ethernet and Internet Protocol (IP) by using the SDI. Therefore, a network media technology in a video industry emerges at a historic moment. Like conventional TV, newspaper, radio and other media, network media are channels for disseminating information, tools for communicating and disseminating information and information carriers. The embodiments of the disclosure relates to data transmission between the cloud server and the Software Development Kit (SDK) of a cloud gaming application platform on the terminal device.

The technical solutions in the embodiments of the disclosure are described below with reference to the accompanying drawings.

Before describing the technical solutions of the embodiments of the disclosure, a flow of an image processing process is schematically described below with reference to FIG. 1 to FIG. 2.

FIG. 1 is a schematic flowchart of an image processing process according to some embodiments of the disclosure. As shown in FIG. 1, a cloud server generates a video, preforms video image collection on the video, processes all the collected video image, encodes the processed video image to obtain a code stream of the video image, and transmits the code stream to a terminal device. Correspondingly, the terminal device receives the code stream transmitted by the cloud server, decodes the code stream, and displays the video image according to a decoding result.

Figure 2:
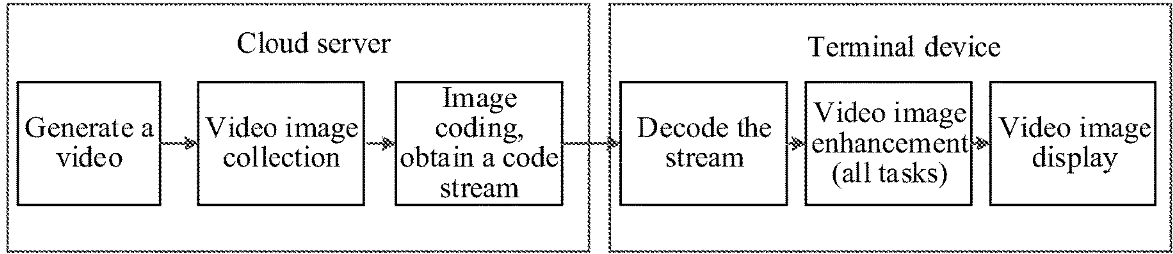
FIG. 2 is a flowchart of another image processing process according to some embodiments of the disclosure.

FIG. 2 is a flowchart of another image processing process according to some embodiments of the disclosure. As shown in FIG. 2, a cloud server generates a video, preforms video image collection on the video, does not process the collected video image, directly encodes the collected video image to obtain a code stream of the video image, and transmits the code stream to a terminal device. Correspondingly, the terminal device receives the code stream transmitted by the cloud server, decodes the code stream, preforms all task processing on the decoded video image, such as sharpening processing, blurring processing, noise reduction processing, etc., and finally displays the processed video image. Exemplarily, processing the decoded video image may display the video image according to a fixed image parameter.

However, in the above image processing mode, the terminal directly displays the decoded video image or displays it with the fixed parameter without processing it, which cannot provide a user with a better cloud gaming picture quality experience.

In an actual application, a set of fixed parameter values are set for the image parameter on the terminal. The parameter values of the set of parameters are generally applied to most games. However, due to the same parameter values, rendering certain limitations on game display, and cannot be applied to all games. For example, the game mode has parameter values such as reducing brightness and increasing sharpness. When the parameter values of these parameters are applied to some game pictures with complex scenes and obvious edges, improving the sharpness would easily make the scenes very sharp, rendering messy pictures and reducing a user's game experience. When applied to some games with dark pictures, reducing the brightness also causes the pictures to be gray and the details of the pictures cannot be seen clearly.

In short, since a game mode in a terminal image mode cannot interact collaboratively with parameter of the running game, the terminal cannot understand a type of game it is dealing with. Therefore, not being able to perceive the parameter needed by a game being played, but setting a set of parameters that are average and most applied to most games, not only makes the parameters less flexible, but also results in a less favorable experience for the user.

Therefore, in order to solve above problems, the embodiments of the disclosure provide an image display method, a terminal device, a server and a storage medium, which can enable the terminal device and a cloud server to cooperate in rendering tasks. According to a rendering ability of the terminal, part of the video image rendering task is completed in the terminal, and resources of the terminal are fully utilized to optimize the video image display, so as to provide a user with a better cloud gaming picture quality experience.

The video or the image rendering tasks completed by the cloud server are completed before coding a video (video pre-processing), while video enhancement tasks completed by an intelligent terminal are completed after decoding a video (video post-processing).

A flow of an end cloud collaboration in an image processing process is schematically described below with reference to FIG. 3.

Figure 3:
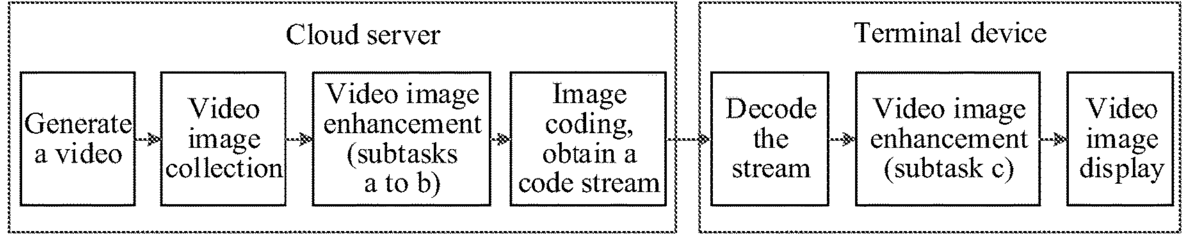
FIG. 3 is a flowchart of another image processing process according to some embodiments of the disclosure.

As shown in FIG. 3, a cloud server generates a video, preforms video image collection on the video, preforms part of task (sub-task a to sub-task b) processing on the collected video image, encodes the processed video image to obtain a code stream of the video image, and transmits the code stream to a terminal device. Correspondingly, the terminal device receives the code stream transmitted by the cloud server, decodes the code stream, performs rest task (sub-task c) processing on the decoded video image, and displays the processed video image.

A scene provided by some embodiments of the disclosure is schematically described below with reference to FIG. 4.

FIG. 4 is a schematic diagram 100 of a scene according to some embodiments of the disclosure. FIG. 4 is only an example of some embodiments of the disclosure and not limited in the disclosure.

As shown in FIG. 4, the system framework 100 includes a terminal device 110 and a server 120.

The server 120 may be an independent physical server, may also be a server cluster or a distributed system composed of multiple physical servers, and may further be a cloud server that provides basic cloud computing services such as cloud services, cloud databases, cloud computing, cloud functions, cloud storage, network services, cloud communication, middleware services, domain name services, security services, Content Delivery Network (CDN), and big data and artificial intelligence platforms. When performing rendering process on a cloud gaming, this server is usually the cloud server. The cloud server is a server that runs games in the cloud and has video enhancement (precoding processing) and video coding functions.

The terminal device 110 may be a smart TV, a home large screen device, a smart phone, a tablet computer, a car terminal, a handheld game console and other small personal portable device, such as Personal Digital Assistant (PDA), Electronic Book (E-book) etc., but this is not limited. The terminal device 110 and the server 120 may be connected directly or indirectly by wired or wireless communication. This is not limited in the embodiment of the disclosure.

The quantity of terminal devices and servers in FIG. 4 is only schematic, and any quantity of terminal devices and servers can be possessed according to actual needs.

Exemplarily, the terminal device 110 is installed with SDK of a cloud gaming application platform, and the server 120 may be a server that is responsible for a cloud game rendering processing. The terminal device 110 communicates with the server 120 through the SDK, and a network 130 provides a medium of communication link between the SDK and the server 120.

In general, the server 120 may transmit a rendered cloud gaming image to the terminal device 110 through an application client. The terminal device 110 receives the cloud gaming image through the SDK and displays the cloud gaming image based on the parameter values of the image parameters on the terminal device. Common image parameters may include: brightness, contrast, chroma, color temperature, gamma, sharpness and other options, as well as the selection of motion compensation, noise reduction, etc.

For ease of understanding of the technical solutions described in the embodiments of the disclosure, terms involved in the embodiments of the disclosure are described below first.

1. High Dynamic Range (HDR) ability: mainly refers to a HDR color tuning ability or an ability of Standard Dynamic Range (SDR) to HDR of a terminal or a cloud.
2. Gamma: an image brightness conversion function, which can map image brightness according to exponential curve changes to achieve dark or bright picture quality.
3. Image sharpening: compensating a profile of an image, enhancing edges and gray jump parts of an image, so that the image becomes clear. The image sharpening is divided into spatial domain processing and frequency domain processing. The image sharpening is to highlight edges, profiles of culture features, or features of some linear target elements on the image. This filtering method improves contrast between the edges of the culture features and surrounding pixels, so it is also called edge enhancement.
4. Image noise reduction: a process of reducing noise in digital images, sometimes also known as image noise reduction.

Image display solutions provided by the embodiments of the disclosure are described in detail in the following through following embodiments.

In some embodiments, an image display method provided by the embodiment of the disclosure may be implemented by a terminal device or cloud server alone, or jointly by the terminal device and the cloud server. Taking being implemented by the terminal device as an example, in an actual application, obtain an adjustment ability of an image parameter in a terminal device, and the adjustment ability of the image parameter is used for indicating the image parameter capable of being adjusted in the terminal device; Obtain first data of an image of a first application; and based on the first data includes M first parameters, based on parameter values of the M first parameters, adjust parameter values of M second parameters, respectively, and based on the adjusted parameter values of the M second parameters, display the image of the first application; where the first parameter is an image parameter of the first application indicated by the adjustment ability, which used for controlling a display effect of the image of the first application; and the first parameters have one-to-one correspondence to the second parameters, and an adjustment range of the second parameters includes the parameter values of the first parameters, and the M is greater than or equal to 1.

Exemplarily, FIG. 5 is a schematic flowchart of an image display method 200 according to some embodiments of the disclosure. The method 200 may be executed by a terminal device, and the terminal device may be the terminal device 110 shown in FIG. 4.

As shown in FIG. 5, the method 200 may include some or all of the following operations:

S201: Obtain an adjustment ability of an image parameter in a terminal device, and the adjustment ability of the image parameter is used for indicating the image parameter capable of being adjusted in the terminal device.

S202: Transmit a first request to a cloud server, the first request being used for requesting to obtain the first data of the image of the first application.

S203: Receive the first data of the image of the first application transmitted by the cloud server.

S204: Determine whether the first data includes M first parameters, and the first parameter is an image parameter of the first application indicated by the image parameter adjustment ability in the terminal device, which used for controlling a display effect of the image of the first application, and M≥1.

S205: Based on the first data includes the M first parameters, based on parameter values of the M first parameters, adjust parameter values of M second parameters, respectively, and based on the adjusted parameter values of the M second parameters, display the image of the first application.

Herein, the first parameters have one-to-one correspondence to the second parameters, and an adjustment range of the second parameter includes the parameter values of the first parameters. In an actual application, the first parameters and the second parameters may be brightness, contrast, chroma, color temperature, gamma, sharpness and other options, as well as the selection of motion compensation, noise reduction, etc.

In one implementation, the terminal device receives the first data of the image of the first application transmitted by the cloud server through SDK of an application platform of the first application, and identifies whether the first data includes M first parameters through the SDK. Based on the first data includes the M first parameters, by respectively calling interfaces of M second parameters respectively corresponding to the M first parameters through the SDK, adjust parameter values of the M second parameters to the parameter values of the M first parameters, and based on the adjusted parameter values of the M second parameters, display the image of the first application. The SDK stores the interfaces of the M second parameters.

In some embodiments, the cloud server can transmit the first data of the image of the first application to the terminal device through an application client of the first application.

In some embodiments, after obtaining an adjustment ability of an image parameter in a terminal device, a terminal device may transmit the adjustment ability of the image parameter to a cloud server, so that the cloud server determines the first data of the image of the first application run by the terminal device and return it based on the adjustment ability of the image parameter in the terminal device.

The M first parameters are the parameters matching a first application identifier in a database of the cloud server. Of course, in some other embodiments, the M first parameters may also be parameters matching an image scene of the first application.

In some embodiments, a cloud server may actively transmit first data of an image of a first application to a terminal device. For example, the cloud server may periodically transmit the first data to the terminal during the first application is running by the terminal device. This reduces resource consumption caused by information interaction with the cloud server.

When first data includes M first parameters capable of being adjusted as indicated by an adjustment ability of image parameters in a terminal device, based on parameter values of the M first parameters, adjust parameter values of second parameters corresponding to each first parameter, respectively. In some embodiments, since the first parameters are adjustable image parameters, and an adjustment range of the second parameters includes the parameter values of the first parameters, ensure the M second parameters in the terminal device are parameters capable of being adjusted. On another aspect, since the parameter values of the second parameters are adjusted according to the parameter values of the first parameters, the fixed parameter values of M second parameters in the terminal device for different first applications (such as cloud gaming applications) can avoid a problem of poor image display and a poor user experience of some applications. The embodiment of the disclosure by using the M first parameters for controlling a display effect of an image of the first application, adjust the parameter values of the M second parameters, which enables the terminal device to improve the display effect of the image of the first application, so as to improve the user experience.

Also, since the M first parameters are transmitted to the terminal device, the display effect of the image of the first application is controlled on the terminal device, and the cloud server does not need to process the M first parameters of the image of the first application, which reduces the consumption of computing resources of the cloud server and saves costs.

In some embodiments, the method 200 further includes: Based on the first data not including the M first parameters, the image of the first application is directly displayed. The image of the first application is the image adjusted by the cloud server based on the M first parameters.

In some embodiments, S202 includes: transmitting, in response to an operation performed on the first application on a display interface of the terminal device by a user, the first request to the cloud server.

Exemplarily, the operation performed on the first application may be a press operation, a double click operation, or a click operation, etc., or an input operation performed on the first application. This is not limited in the embodiment of the disclosure.

Exemplarily, the first application may be a cloud gaming application, and the terminal device may transmit the first request to the cloud server through the SDK of an application platform of the cloud gaming application.

In order to implement an end-cloud rendering collaborative configuration of a video image, need to detect a video image rendering ability of the terminal before rendering the video image, to implement the optimal end-cloud rendering collaborative rendering configuration.

A determining process of a video rendering collaborative configuration is schematically described below with reference to FIG. 6.

Figure 6:
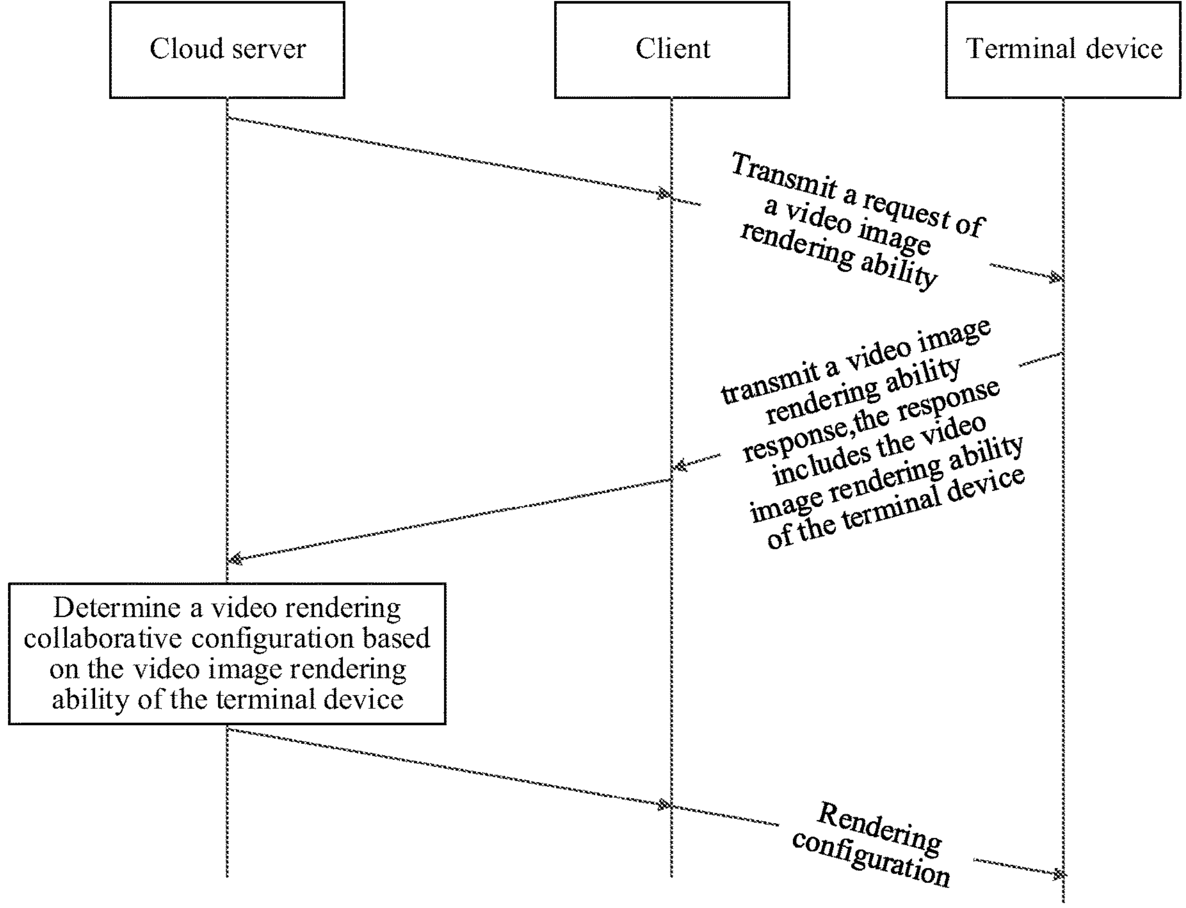
FIG. 6 is a flowchart of determining a video rendering collaborative configuration between a terminal device and a cloud server according to some embodiments of the disclosure.

As shown in FIG. 6, a cloud server can transmit a request of a video image rendering ability to a terminal device through a client installed on the cloud server. The terminal device receives the request, obtains the video image rendering ability on the terminal device, and feeds the video image rendering ability back to the cloud server. The cloud server can receive the response of the video image rendering ability through the client installed on the cloud server.

In some embodiments, a video image rendering ability include, but are not limited to, at least one of the following: a protocol version number, a video resolution, a video frame rate, rendering algorithm types of query.

In some embodiments, the protocol version number refers to the lowest protocol version supported by a cloud server, which may be a rendering protocol. The video resolution may be a resolution of a video source to be rendered, such as 1080p. The video frame rate may be a frame rate of a video source to be rendered, such as 60 fps. The rendering algorithm types of the query may be at least one of the following: a sharpening processing algorithm, a noise reduction processing algorithm, a fuzzy processing algorithm, and a video High Dynamic Range Imaging (HDR) enhancement algorithm.

In some embodiments, different rendering algorithms may be defined by enumeration, as shown in Table 1:

TABLE 1

| Rendering algorithm types | Enumeration definition |
|---|---|
| Undefined | 0 |
| Sharpening processing algorithm | 1 |
| HDR enhancement algorithm | 2 |

In some embodiments, the above request of the video rendering ability may be a request of a rendering ability for an image parameter of the first application.

Data structure of the video rendering ability of the terminal device may be shown in Table 2:

TABLE 2

| Section | Type | Section illustration |
|---|---|---|
| [render_ability] | — | Video rendering ability |
| [analysis_ability] | — | Video analysis ability |
| [render_task] | — | Video rendering task |
| [analysis_task] | — | Video analysis task |
| [renderN] | — | Video rendering algorithm, N is the number 1, 2, 3 . . . |
| [analysisN] | | Video analysis algorithm, N is the number 1, 2, 3 . . . |
| [renderN_args] | | Video rendering algorithm parameters, N is the number 1, 2, 3 . . . |
| [analysisN_args] | — | Video analysis algorithm parameters, N is the number 1, 2, 3 . . . |

TABLE 2-continued

| Key | Type | Value illustration |
| --- | --- | --- |
| resolution | Enumeration | Video size |
| framerate | Enumeration | Video frame rate |
| name | String | Algorithm name. |
| type | Enumeration | Rendering/analysis algorithm types 0: Undefined; 1: Video sharpening algorithm; 2: HDR algorithm; 3: Video image mode; 1001: Video image complexity analysis; 1002: Video image foreground background analysis; |
| renders | Integer types | Quantity of video rendering algorithms. When the quantity of rendering algorithm cascades is N, then N sections are followed: [render1], [render2] to [renderN], respectively, identifies information of N video rendering algorithms. |
| analyses | Integer types | Quantity of video image analysis algorithms. When the quantity of video image analysis is N, then N sections are followed: [analysis1], [analysis2] to [analysisN], respectively, identifies algorithms of N video image analysis |
| performances | Integer types | Quantity of rendering/analysis performance indicators of terminal devices. When the quantity of rendering/analysis performance indicators of the decoder is N, performance1, performance2 to performanceN, respectively, identifies the content of N performances. |
| performanceN | String (Triples) | N is the number 1, 2, 3 . . . Representing the Triples of performance data supported by a smart terminal, the first element is the video size, the second element is the video frame rate, and the third element is the single frame rendering delay, in milliseconds. Based on the terminal device render 1080 p @ 60 fps can reach 5 ms, represents performanceN = 8, 8, 5 |
| scale | Integer types | Identify a scale of rectangular area coordinates; It is identified as a full map area without such field. |
| regions | Integer types | Integer types. Quantity of rectangular areas. When the quantity of rectangular areas is N, then N Key followed: region1, region2 to regionN, respectively, identifies N areas. It is identified as a full map area without such field. |
| regionN | Integer types | N is the number 1, 2, 3 . . . Represent a rectangular area, which are the left, upper, right and lower coordinates of the rectangular coordinates, respectively. The values are scaled according to the scale value. Example: For width multiplied by height video image size, the rectangular area = l, t, r, b represents that the rectangular area coordinates are: Left = floor (width multiplied by l/scale) Upper = floor (height multiplied by t/scale) Right-ceil (width multiplied by r/scale) − 1 Lower = ceil (height multiplied by b/scale) − 1 |
| arg1 . . . argN | Specified by algorithms | The video enhancement/analysis algorithm parameters are specified by a specific algorithm. |

In some embodiments, the video rendering ability response may include at least one of the following, but is not limited to: an identifier of whether the rendering algorithm type to be queried by the cloud server is successfully queried, the protocol version number supported by the terminal device, and ability information of the terminal device.

In some embodiments, based on the type of the rendering algorithm to be queried by the cloud server is successfully queried, the identifier of whether the type of the rendering algorithm to be queried by the cloud server is successfully queried may be represented by 0. Based on the type of the rendering algorithm to be queried by the cloud server fails to be queried, the identifier of whether the type of the rendering algorithm to be queried by the cloud server is successfully queried may be represented by an error code, such as 001, etc.

In some embodiments, the protocol version number refers to the lowest protocol version supported by a terminal device, which may be a rendering protocol.

In some embodiments, the terminal device rendering ability information may include at least one of the following, but is not limited to: the type of rendering algorithm supported by the terminal device and the performance of the rendering algorithm.

In some embodiments, the performance of the rendering algorithm include, but are not limited to, at least one of the following: the algorithm can deal with the video size, the frame rate and the time delay.

Exemplarily, a data structure of the video rendering ability response may be shown in Table 3.

TABLE 3

| Video rendering ability response | |
|---|---|
| [render_ability] | Video rendering ability |
| state = 0 | Feed back a status code 0 after the query is successful |
| version = 1.0 | Terminal protocol version |
| renders = 1 | Support one video rendering algorithm, information in subsequent [render1] |
| [render1] | First video rendering algorithm ability information |
| type = 1 | Render is enhanced for video sharpening |
| performances = 1 | The Video sharpening enhances one performance, information in performance1 |
| performance1 = 8, 8, 10 | Video sharpening enhancement at 1080 p @ 60 fps render 10ms |

In some embodiments, the video rendering ability of a terminal device may be divided into the following three cases: Case one: the terminal device has a full video rendering ability for a video image, as shown in FIG. 2. Case two: the terminal device has a part video rendering ability for a video image, as shown in FIG. 3. Case three: the terminal device has no video rendering ability for a video image, as shown in FIG. 1.

The different video rendering ability of the terminal device may be defined by enumeration, as shown in Table 4:

TABLE 4

| Rendering ability | Enumeration definition |
|---|---|
| Undefined | 0 |
| No video rendering ability | 1 |
| Part video rendering ability | 2 |
| Full video rendering ability | 3 |

In some embodiments, before determining that a terminal device obtains first data of an image of the first application, first needs to receive a request of a terminal rendering ability transmitted by a cloud server to the terminal device to obtain the terminal rendering ability, which may be an adjustment ability of an image parameter in the embodiment of the disclosure.

In some embodiments, S201 includes: receiving an adjustment ability request transmitted by the cloud server, the adjustment ability request being used for the terminal device requesting to query the image parameter capable of being adjusted in N image parameters, the adjustment ability request including N target adjustment ranges corresponding to the N image parameters, respectively, and interfaces of the N image parameters, the N image parameters including the M second parameters, and the target adjustment range is the range preset by the cloud server to determine the adjustment ability of the image parameters in the terminal device, and $N \geq M \geq 1$;

performing, in response to the adjustment ability request, the following processing on each third parameter in the N image parameters, respectively:

calling the interface of the third parameter to obtain the adjustment range of the third parameter, the third parameter being any image parameter in the N image parameters;

determining, based on the adjustment range of the third parameter being a numerical interval, that the third parameter is the image parameter capable of being adjusted in the terminal device;

determining, based on the adjustment range of the third parameter not being a numerical interval, whether the adjustment range of the third parameter includes the target adjustment range corresponding to the third parameter; determining, based on the adjustment range of the third parameter includes the target adjustment range corresponding to the third parameter, that the third parameter is the image parameter capable of being adjusted in the terminal device; based on the adjustment range of the third parameter is not a numerical interval, and the adjustment range of the third parameter does not include the target adjustment range corresponding to the third parameter, the third parameter is the image parameter incapable of being adjusted in the terminal device; and transmitting the adjustment ability of the image parameter to the cloud server.

In other words, after the terminal device receives the adjustment ability request transmitted by the cloud server, for the third parameter of the N image parameters, based on the adjustment range of the third parameter is a numerical interval, or the adjustment range of the third parameter is compared with the target adjustment range corresponding to the third parameter, the adjustment range of the third parameter is greater than or equal to the target adjustment range corresponding to the third parameter, the third parameter is an image parameter capable of being adjusted in the terminal device; and based on the adjustment range of the third parameter is not a numerical interval, and the adjustment range of the third parameter is compared with the target adjustment range corresponding to the third parameter, the adjustment range of the third parameter is incomplete or non-existent, the third parameter is determined to be the image parameter incapable of being adjusted in the terminal device.

In one implementation, the terminal device receives the adjustment ability request transmitted by the cloud server through the SDK of the application platform of the first application, transmits the adjustment ability request to an operating system of the terminal device through the SDK, and requests the terminal device to query the image parameters capable of being adjusted in N image parameters. After receiving the query request, the operating system of the terminal device accesses a hardware of the terminal device based on the interface of N image parameters in the query request, obtain the adjustment range of the N image parameters, and compares N target adjustment ranges with the adjustment range of N image parameters respectively, and determine the image parameters capable of being adjusted in the N image parameters.

The target adjustment range is the range preset by the cloud server to determine the adjustment ability of the image parameters in the terminal device. The target adjustment range may include a numerical interval and further include multiple parameter value options.

Before receiving the first data of the image of the first application transmitted by the cloud server, first receive the adjustment ability request transmitted by the cloud server and query the adjustment capability of the image parameter in the terminal device. In other words, it is considered that part of the task of optimizing the image display effect is perform by the terminal device, so as to reduce the pressure of data processing of the cloud server.

Of course, in other optional embodiments, regardless of whether an adjustment range of the third parameter is a numerical interval, need to determine whether the adjustment range of the third parameter includes a corresponding target adjustment range of the third parameter. Based on the adjustment range of the third parameter includes the target adjustment range corresponding to the third parameter, the third parameter is determined as an image parameter capable of being adjusted in the terminal device. Otherwise, the third parameter is the image parameter incapable of being adjusted in the terminal device.

Of course, in other optional embodiments, image parameters in all adjustment ranges on the terminal device are also determined as image parameters capable of being adjusted.

Exemplarily, a process of obtaining an adjustment ability provided in this embodiment of the disclosure is exemplarily described below with reference to FIG. 7.

Figure 7:
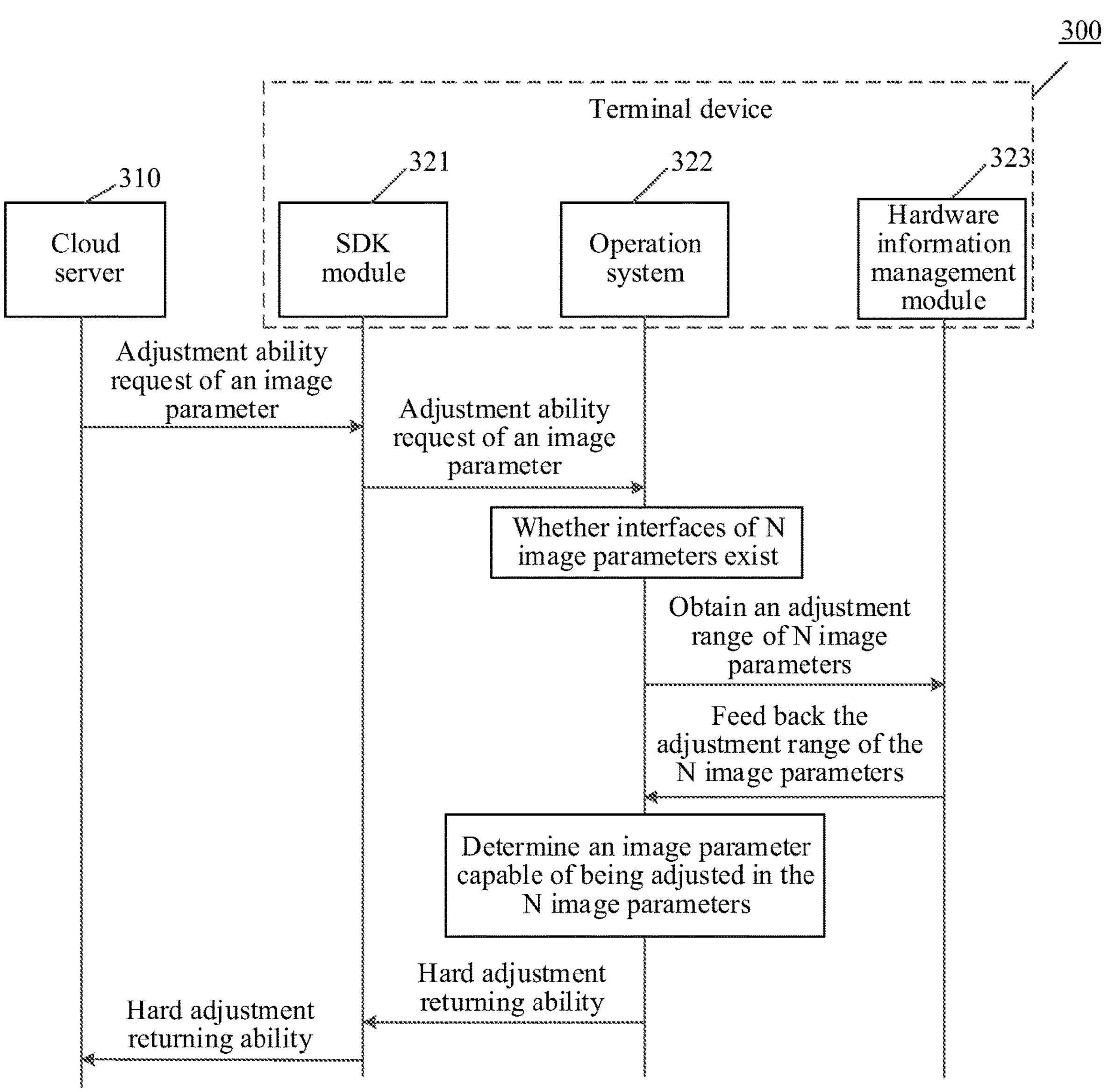
FIG. 7 is a schematic flowchart of obtaining an adjustment ability of an image parameter on a terminal device according to some embodiments of the disclosure.

FIG. 7 is an interaction flowchart 300 of determining an adjustment ability between a terminal device and a cloud server according to some embodiments of the disclosure.

As shown in FIG. 7, a cloud server 310 and a terminal device 320 are included. The terminal device 320 includes a SDK module 321, an operating system 322 and a hardware information management module 323 of the terminal device.

In some embodiments, the cloud server 310 is configured to transmit an adjustment ability request to the terminal device 320, and the adjustment ability request includes N target adjustment ranges corresponding to the N image parameters, respectively, and interfaces of the N image parameters.

The terminal device 320 receives the adjustment ability request transmitted by the cloud server 310 through the SDK module 321 and transmits the adjustment ability request to the operating system 322 of the terminal device through the SDK module 321.

The operating system 322 receives the adjustment ability request. First, check whether the interfaces of the N image parameters exist on the terminal device. Based on the interfaces of the N image parameters exist, the operating system 322 calls the interfaces of the N image parameters and obtains the adjustment range of the N image parameters from the hardware information management module 323. Then, the adjustment range of the N image parameters is compared with the adjustment range of the N target parameters, and determines the image parameter capable of being adjusted in the N image parameters. Finally, the image parameter capable of being adjusted in the N image parameters are transmitted to the SDK module 321, that is, the adjustment ability is fed back to the SDK module 321.

The SDK module 321 transmits the image parameters capable of being adjusted in the N image parameters to the cloud server 310.

Exemplarily, the cloud server can transmit the adjustment ability request to the terminal device through an application client of the first application.

When the operating system 322 transmits the adjustment ability (the image parameter capable of being adjusted in the N image parameters) to the SDK module 321, based on the adjustment range of the image parameter is a numerical interval, the adjustment range of the image parameter is transmitted to the SDK module 321. Based on the adjustment range of the image parameter is multiple parameter value options, the operating system 322 only feed the image parameter capable of being adjusted back to the SDK module 321.

The interfaces of the N image parameters may be confirmed by a cloud and a terminal device manufacturer. The N target adjustment ranges corresponding to the N image parameters, respectively, may be shown in Table 5. The quantity of the N image parameters may be increased or decreased according to the ability of the terminal device. The N target adjustment ranges corresponding to the N image parameters may be the adjustment range of the N first parameters corresponding to the N image parameters.

TABLE 5

| First parameter | Target adjustment range |
|---|---|
| Brightness | 0-100 |
| Contrast | 0-100 |
| Chroma | 0-100 |
| Clarity | 0-100 |
| HDR ability | On/off |
| Image sharpening | On/off |
| Image noise reduction | Off, low, medium, strong |
| Gamma | Dark, standard, light |
| Color temperature | Cool color, standard color, warm color |

With reference to Table 5 and the above FIG. 7, based on the adjustment range of brightness parameter in N image parameters in the terminal device is 0 to 255, and with reference to Table 5, the target adjustment range corresponding to the brightness parameter is 0 to 100, since 0 to 255 includes 0 to 100, the brightness parameter in the terminal device is determined as the image parameter capable of being adjusted, and feed the adjustment range of the brightness parameter 0 to 255 back to the cloud server. Of course, in some embodiments, based on the adjustment range of the brightness parameter in the N image parameters is 0 to 255, since the adjustment range is a numerical interval, the brightness parameter in the terminal device may be directly determined as the image parameter capable of being adjusted.

Based on the adjustment range of a color temperature parameter in the N image parameters in the terminal device is cool color and standard color, with reference to Table 5, a target adjustment range corresponding to the color temperature parameter is cool color, standard color and warm color. Since the cool color and the standard does not include cool color, standard color, warm color, the color temperature parameter is determined as the parameter incapable of being adjusted in the N image parameters, and the adjustment ability of the color temperature parameter may be determined as NULL and fed back to the cloud server.

In some embodiments, when calling the interface of the third parameter to obtain the adjustment range of the third parameter, the terminal first determines whether the interface of the third parameter exists, and calls, based on the interface of the third parameter exists, the interface of the third parameter to obtain the adjustment range of the third parameter. Based on no interface of the third parameter existing, the adjustment range of the third parameter is null.

In other words, before calling the interface of the third parameter, the terminal device first determines whether the interface of the third parameter exists on the terminal device. Call, based on the interface of the third parameter exists, the interface of the third parameter to obtain the adjustment range of the third parameter. Based on no interface of the third parameter exists, the adjustment range of the third parameter is null, that is, the third parameter is the parameter incapable of being adjusted in the terminal device.

By determining whether the interface exists before accessing it, data loss or errors may be caused during network transmission. In order to ensure the validity of accessing data, before calling the interface of the third parameter, the terminal device first determines whether the interface of the third parameter exists.

In some embodiments, transmit, based on the third parameter is the image parameter capable of being adjusted in the terminal device, the adjustment range of the third parameter is a numerical interval, and the adjustment range of the third parameter is different from the target adjustment range corresponding to the third parameter, the adjustment range of the third parameter to the cloud server.

When the adjustment ability of the third parameter is transmitted to the cloud server, the adjustment range of the third parameter is transmitted to the cloud server. When the cloud server transmits the first parameter corresponding to the third parameter to the terminal device, based on the adjustment range of the third parameter is different from the adjustment range of the first parameter, a parameter value of the first parameter is needed to convert into a parameter value in the adjustment range of the third parameter, to ensure that a measurement standard of the parameter value of the terminal device and the corresponding parameter value of the cloud server is unified, so as to implement an expected image display effect of the cloud server after adjusting the corresponding parameter on the terminal device based on the parameters transmitted by the cloud server.

In some embodiments of the disclosure, the N image parameters include at least one of the following:

a brightness parameter, a chroma parameter, a contrast parameter, a sharpness parameter, a high dynamic range HDR ability parameter, an image sharpening parameter, an image noise reduction parameter, a gamma parameter, and a color temperature parameter.

In some embodiments, when an image display method provided by the embodiment of the disclosure is implemented by the cloud server alone, a cloud server obtains an adjustment ability of an image parameter in a terminal device, and obtain first data of an image of a first application. The adjustment ability of the image parameter is used for indicating the image parameter capable of being adjusted in the terminal device. Transmit, based on the first data includes M first parameters, the first data of the image of the first application to the terminal device. The first parameter is an image parameter of the first application indicated by the adjustment ability for controlling a display effect of the image of the first application. Parameter values of the M first parameters is used for the terminal device to adjust parameter values of M second parameters, and based on the adjusted parameter values of the M second parameters, display the image of the first application. The first parameters have one-to-one correspondence to the second parameters, and an adjustment range of the second parameters includes the parameter values of the first parameters, and the M is greater than or equal to 1.

In some embodiments, the cloud server may obtain an adjustment ability of an image parameter in a terminal device in the following operations: receiving a terminal device identifier transmitted by the terminal device, and based on the terminal device identifier, obtaining the adjustment ability of the image parameter in the terminal device; or, receiving the adjustment ability of the image parameter in the terminal device transmitted by the terminal device.

In some embodiments, based on the first data includes M first parameters, the cloud server may transmit the first data of the image of the first application to the terminal device in the following operations:

transmitting, based on the first data includes M first parameters, in response to a first request transmitted by the terminal device, the first data of the image of the first application to the terminal device; the first request being used for requesting to obtain the first data of the image of the first application.

In some embodiments, the first request includes a first application identifier. A cloud server may obtain first data of an image of a first application in the following operations: obtaining, by the cloud server, based on the first application identifier, N first parameters and the image of the first application; the N first parameters being used for controlling a display effect of the image of the first application, the N first parameters including the M first parameters, the N being greater than or equal to the M; and determining, based on the image parameter indicated by the adjustment ability of the image parameter includes the M second parameters, the M first parameters respectively corresponding to the M second parameters and the image of the first application as the first data.

Figure 8:
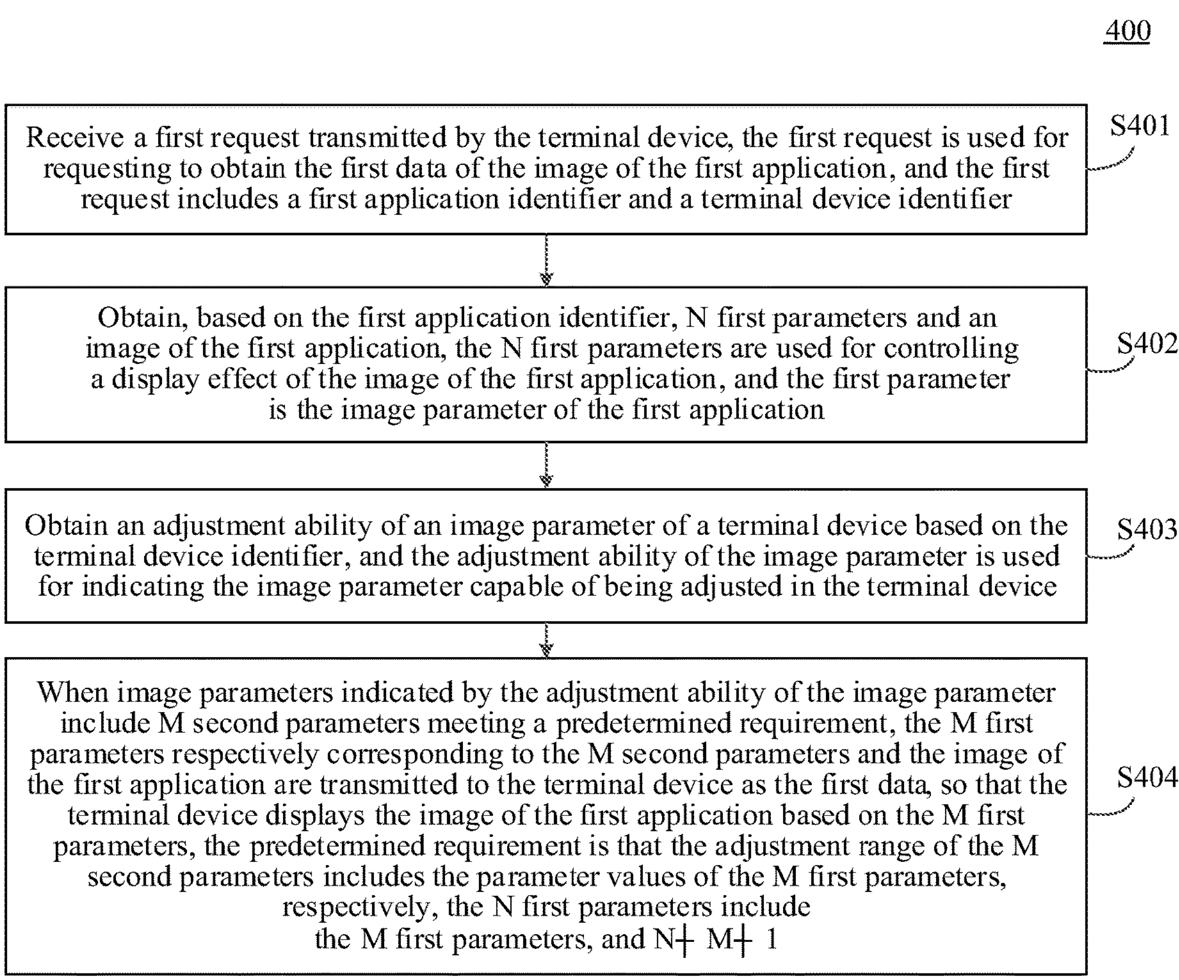
FIG. 8 is another schematic flowchart of an image display method according to some embodiments of the disclosure.

Exemplarily, FIG. 8 is a schematic flowchart of an image display method 400 according to some embodiments of the disclosure. The method 400 may be executed by a cloud server, and the cloud server may be the server 120 shown in FIG. 4. As shown in FIG. 8, the method 400 may include some or all of the following operations:

S401: Receive a first request transmitted by the terminal device, the first request being used for requesting to obtain the first data of the image of the first application, the first request including a first application identifier and a terminal device identifier.

S402: Obtain, based on the first application identifier, N first parameters and an image of the first application, the N first parameters being used for controlling a display effect of the image of the first application, the first parameter being the image parameter of the first application.

S403: Obtain an adjustment ability of an image parameter in a terminal device based on the terminal device identifier, and the adjustment ability of the image parameter is used for indicating the image parameter capable of being adjusted in the terminal device.

S404: When image parameters indicated by the adjustment ability of the image parameter include M second parameters meeting a predetermined requirement, the M first parameters respectively corresponding to the M second parameters and the image of the first application are transmitted to the terminal device as the first data, so that the terminal device displays the image of the first application based on the M first parameters, and the predetermined requirement is that the adjustment range of the M second parameters includes the parameter values of the M first parameters, respectively, and the N first parameters include the M first parameters, N≥M≥1.

In other words, the cloud server receives the first request transmitted by the terminal device. Firstly, based on the first application identifier in the first request, the cloud server obtains N first parameters associated with the first application identifier in the database. Then, based on the terminal device identifier in the first request, the cloud server obtains the adjustment ability of the image parameters in the terminal device. Finally, based on the adjustment ability of the image parameter in the terminal device, the cloud server transmits the image parameters indicated by the adjustment ability of the image parameter including the M first parameters respectively corresponding to the M second parameters and the image of the first application meeting the predetermined requirement to the terminal device, so that the terminal device adjusts the parameter values of the M second parameters corresponding to the parameter values of the M first parameters based on the parameter values of the M first parameters, and controls to display the image of the first application based on the adjusted parameter values of the M second parameters.

In one implementation, a cloud server receives the first request from a SDK of a cloud gaming application platform on a terminal device through an application client. Exemplarily, the first application is a cloud gaming application. The N first parameters may also be parameters matching a scene of the first application.

Based on the above technical solutions, firstly, based on the first application identifier, N first parameters applied to the image display of the first application are obtained. The image parameter values needed by different first applications (for example, cloud gaming applications) are different. Customizing different parameters for different first applications is helpful to implement the best display effect for the images of different applications during displaying. Then, by obtaining the adjustment ability of the image parameter in the terminal device corresponding to the terminal device terminal device, in order to save computing resources of the cloud server, part of the task of controlling the image display of the first application is executed by the terminal device. In order to implement this purpose, the cloud server needs to determine the adjustment ability of the image parameter in the terminal device. Finally, the M first parameters respectively corresponding to the M second parameters and the image of the first application meeting the predetermined requirement in the image parameter indicated by the adjustment ability of the image parameter in the terminal device are transmitted to the terminal device as the first data, so that the terminal device controls to display the image of the first application based on the M first parameters. It is not only helpful to implement the best display effect of the first application, so as to improve user experience, but also does not need the cloud server to process the M first parameters, reducing the consumption of computing resources on the cloud server and saving costs.

The N first parameters corresponding to the first application identifier is exemplarily described below with reference to FIG. 6.

TABLE 6

| First parameter | Parameter value |
|---|---|
| Brightness | 50 |
| Contrast | 50 |
| Chroma | 50 |
| Clarity | 50 |
| HDR ability | On |
| Image sharpening | On |
| Image noise reduction | Off |
| Gamma | Light |
| Color temperature | Warm color |

The N first parameters may be predefined by the cloud server based on a type or scene of the first application. The N first parameters are associated with the first application identifier.

In some embodiments of the disclosure, the method 400 further includes:

based on the image parameter indicated by the adjustment ability of the image parameter do not include K second parameters meeting a predetermined requirement and respectively corresponding to K first parameters, based on the K first parameters, adjusting the image of the first application to obtain an adjusted image, and transmitting the adjusted image as the first data to the terminal device, the N first parameters including the K first parameters, K>1.

By adjusting the image of the first application based on the K first parameters. In some embodiments, for the M second parameters of the image parameters indicated by the adjustment ability of the image parameters meeting the predetermined requirement, the cloud server transmits the M first parameters respectively corresponding to the M second parameters to the terminal device, so that the terminal device uses the M first parameters to control the image display effect of the first application. On another aspect, when the image parameter indicated by the adjustment ability of the image parameter does not include K second parameters meeting a predetermined requirement and respectively corresponding to K first parameters, the cloud server uses the K first parameters to adjust the image of the first application. That is, the terminal device and cloud server cooperate to implement the improvement of the display effect of the image of the first application.

The N image parameters include the K second parameters.

With reference to Table 6, based on the M first parameters respectively corresponding to M second parameters are brightness, contrast and chroma, the K first parameters respectively corresponding to K second parameters are other six parameters except brightness, contrast and chroma in nine parameters shown in Table 6. With reference to a parameter value of the first parameter in Table 6, that is, the cloud server needs to perform a sharpening processing on the image of the first application, adjust a clarity to 50, turn on a HDR ability, perform HDR color tuning, set the gamma function to light, and convert an image color temperature to warm color. Parameter values corresponding to brightness, contrast and chroma in Table 6 are transmitted to the terminal device, so that the terminal device displays the image of the first application based on the parameter values of brightness, contrast and chroma.

Based on the image parameters indicated by the adjustment ability of the image parameters including M second parameters meeting the predetermined requirement, and the M second parameters have one-to-one correspondence to N first parameters, respectively, the cloud server does not need to do any adjustment, and puts all the image processing process on the terminal to implement that only the terminal processes the image of the first application.

In some embodiments of the disclosure, S402 includes:

querying the N first parameters matching the first application identifier in a database, the database including at least one identifier and the N first parameters corresponding to each identifier in the at least one identifier, the at least one identifier including the first application identifier.

In one implementation, the cloud server classifies different applications to obtain different application identifiers, and obtains a customized image parameter for each application. The customized image parameter of each application is associated with the application identifier and stored in a configuration file of the cloud server. When the first application is running, the cloud server obtains the image parameters (N first parameters) corresponding to the first application identifier from the configuration file.

The image parameters are generally stored in the form of strings, which can be parsed as shown in Table 6 above.

In some embodiments of the disclosure, before S404, the method further includes:

For the third parameter in the M second parameters, based on an adjustment range of the third parameter is a numerical interval, and a target adjustment range corresponding to the third parameter is different from the adjustment range of the third parameter, converting a parameter value of the first parameter corresponding to the third parameter into the parameter value corresponding to the third parameter in the adjustment range of the third parameter to obtain a new first parameter corresponding to the third parameter, and transmitting the new first parameter and the first application image as the first data to the terminal device, the target adjustment range being the range preset by the cloud server to determine the adjustment ability of the image parameters in the terminal device; and based on the adjustment range of the third parameter not being a numerical interval, or the target adjustment range corresponding to the third parameter is the same as the adjustment range of the third parameter, transmitting the first parameter corresponding to the third parameter and the image of the first application as the first data to the terminal device directly.

In one implementation, with reference to the above Table 5, based on the third parameter being one of brightness, contrast, chroma or sharpness, and the maximum value of the adjustment range of the third parameter is $X_{max}$, the minimum value is $X_{min}$, and $X_{max}$ is not equal to 100, $X_{min}$ not equal to 0, the parameter value of the first parameter corresponding to the third parameter needs to be converted into the parameter value corresponding to the third parameter in the adjustment range of the third parameter. Exemplarily, the parameter value of the first parameter may be converted into the parameter value corresponding to the third parameter in the adjustment range of the third parameter through the following formula (1).

$$X_q=\text{round}(x*(100-0)/(X_{max}-X_{min})) \quad \text{Formula (1);}$$

$X_q$ is the parameter value of the first parameter corresponding to the third parameter, x is the parameter value corresponding to the parameter value of the first parameter in the adjustment range of the third parameter needed to be computed, round is the rounded integer function, $X_{min}$ is the minimum value in the adjustment range of the third parameter, $X_{max}$ is the maximum value in the adjustment range of the third parameter.

When the cloud server transmits the first parameter corresponding to the third parameter to the terminal device, based on the adjustment range of the third parameter is different from the adjustment range of the first parameter, a parameter value of the first parameter is needed to convert into a parameter value in the adjustment range of the third parameter, to ensure that a measurement standard of the parameter value of the terminal device and the corresponding parameter value of the cloud server is unified, so as to implement an expected image display effect of the cloud server after adjusting the corresponding parameter on the terminal device based on the parameters transmitted by the cloud server.

In some embodiments of the disclosure, before S401, the method further includes:

transmitting an adjustment ability request to the terminal device, the adjustment ability request being used for requesting the terminal device to query the image parameter capable of being adjusted in the N image parameters, the adjustment ability request including the N image parameters corresponding to the N target adjustment ranges, and the interfaces of N image parameters, N≥1; the N image parameters including the M second parameters, and the target adjustment range is the range preset by the cloud server to determine the adjustment ability of the image parameters in the terminal device; and receiving the adjustment ability of N image parameters transmitted by the terminal device.

The N image parameters may correspond to the N first parameters respectively. For example, the adjustment range of the N first parameters is shown in Table 5, that is, the target adjustment range corresponding to the N image parameters is shown in Table 5. The quantity of the N image parameters may be increased or decreased according to the ability of the terminal device.

In some embodiments of the disclosure, the N image parameters include at least one of the following:

a brightness parameter, a chroma parameter, a contrast parameter, a sharpness parameter, a high dynamic range HDR ability parameter, a sharpening parameter, an image noise reduction parameter, a gamma parameter, and a color temperature parameter.

The method provided by the embodiment of the disclosure is described above, and the image display device provided by the embodiment of the disclosure is described below.

Figure 9:
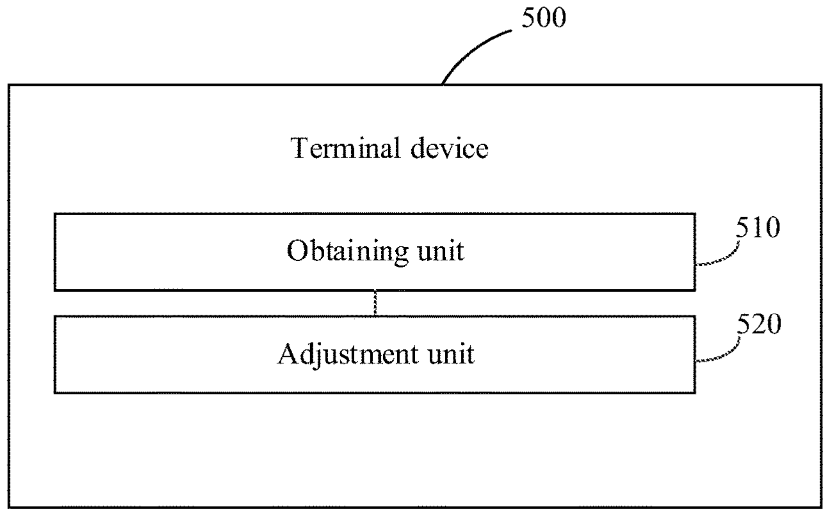
FIG. 9 is a schematic block diagram of a terminal device according to some embodiments of the disclosure.

FIG. 9 is a schematic block diagram of a terminal device 500 according to some embodiments of the disclosure. As shown in FIG. 9, the terminal device 500 includes:

an obtaining unit 510, configured to obtain an adjustment ability of an image parameter in a terminal device, the adjustment ability of the image parameter being used for indicating the image parameter capable of being adjusted in the terminal device;

the obtaining unit 510, further configured to obtain first data of an image of a first application; and an adjustment unit 520, configured to, based on the first data includes M first parameters, based on parameter values of the M first parameters, adjust parameter values of M second parameters, respectively, and based on the adjusted parameter values of the M second parameters, display the image of the first application;

the M first parameters being used for controlling a display effect of the image of the first application, the first parameter being the image parameter of the first application indicated by the adjustment ability; the first parameters having one-to-one correspondence to the second parameters, an adjustment range of the second parameters including the parameter values of the first parameters, and nM being greater than or equal to 1.

In some embodiments, the obtaining unit 510 includes a transmitting unit and a receiving unit. The transmitting unit is configured to transmit a first request to a cloud server, the first request being used for requesting to obtain the first data of the image of the first application.

The receiving unit is configured to receive the first data of the image of the first application transmitted by the cloud server.

In some embodiments, the apparatus further includes:

a determining unit, configured to determine whether the first data includes M first parameters respectively corresponding to M second parameters, and the first parameter meeting the predetermined requirement. The predetermined requirement is a parameter value that the adjustment range of the M second parameters includes the parameter values of the M first parameters, respectively, M≥1.

In some embodiments, the transmitting unit is further configured to:

transmitting, in response to an operation performed on the first application on a display interface of the terminal device, the first request to the cloud server.

In some embodiments, the obtaining unit is further configured to:

receiving the adjustment ability request transmitted by the cloud server, the adjustment ability request being used for requesting the terminal device to query the image parameter capable of being adjusted in the N image parameters, the adjustment ability request including the N image parameters corresponding to the N target adjustment ranges, and the interfaces of N image parameters, the N image parameters including the M second parameters, and the target adjustment range is the range preset by the cloud server to determine the adjustment ability of the image parameters in the terminal device, and N≥M≥1;

performing, in response to the adjustment ability request, the following processing on each third parameter in the N image parameters, respectively:

calling the interface of the third parameter to obtain the adjustment range of the third parameter, the third parameter being any image parameter in the N image parameters;

determining, based on the adjustment range of the third parameter is a numerical interval, that the third parameter is the image parameter capable of being adjusted in the terminal device;

based on the adjustment range of the third parameter is not a numerical interval, and the adjustment range of the third parameter includes the target adjustment range corresponding to the third parameter, determining that the third parameter is the image parameter capable of being adjusted in the terminal device; and determining, based on the adjustment range of the third parameter includes the target adjustment range corresponding to the third parameter, that the third parameter is the image parameter incapable of being adjusted in the terminal device;

transmitting the adjustment ability of the image parameter to the cloud server.

In some embodiments of the disclosure, transmit, based on the third parameter being the image parameter capable of being adjusted in the terminal device, the adjustment range of the third parameter is a numerical interval, and the adjustment range of the third parameter is different from the target adjustment range corresponding to the third parameter, the adjustment range of the third parameter to the cloud server.

In some embodiments of the disclosure, the obtaining unit is further configured to:

determining whether the interface of the third parameter exists;

calling, based on the interface of the third parameter exists, the interface of the third parameter to obtain the adjustment range of the third parameter;

determining, based on no interface of the third parameter exists, that the adjustment range of the third parameter is null.

In some embodiments of the disclosure, the N image parameters include at least one of the following:

a brightness parameter, a chroma parameter, a contrast parameter, a sharpness parameter, a high dynamic range HDR ability parameter, an image sharpening parameter, an image noise reduction parameter, a gamma parameter, and a color temperature parameter.

In some embodiments of the disclosure, the first application is a cloud gaming application.

Figure 10:
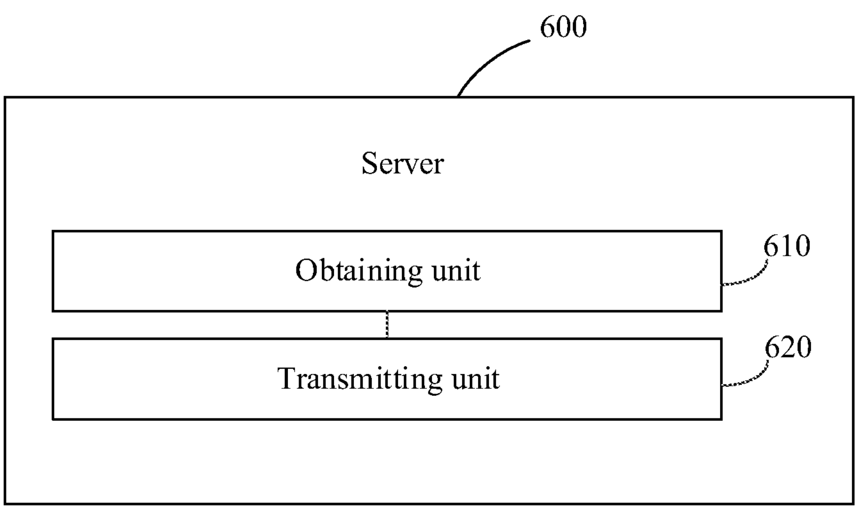
FIG. 10 is a schematic block diagram of a server according to some embodiments of the disclosure.

FIG. 10 is a schematic block diagram of a server 600 according to some embodiments of the disclosure. As shown in FIG. 10, the server 600 includes:

an obtaining unit 610, configured to obtain an adjustment ability of an image parameter in a terminal device, and obtain first data of an image of a first application;

the adjustment ability of the image parameter being used for indicating the image parameter capable of being adjusted in the terminal device; and a transmitting unit 620, configure to based on the first data includes M first parameters, transmit the first data to the terminal device;

the first parameter being an image parameter of the first application indicated by the adjustment ability for controlling a display effect of the image of the first application; and parameter values of the M first parameters being used for the terminal device to adjust parameter values of M second parameters, and based on the adjusted parameter values of the M second parameters, displaying the image of the first application;

the first parameters having one-to-one correspondence to the second parameters, an adjustment range of the second parameters including the parameter values of the first parameters, and the M being greater than or equal to 1.

In some embodiments, the obtaining unit is further configured to receive a terminal device identifier transmitted by the terminal device, and based on the terminal device identifier, obtaining the adjustment ability of the image parameter in the terminal device; or, receive the adjustment ability of the image parameter in the terminal device transmitted by the terminal device.

In some embodiments, the transmitting unit is further configured to based on the first data includes M first parameters, in response to a first request transmitted by the terminal device, transmit the first data of the image of the first application to the terminal device;

the first request being used for requesting to obtain the first data of the image of the first application.

In some embodiments, the first request includes a first application identifier. The obtaining unit is further configured to, based on the first application identifier, obtain N first parameters and the image of the first application; the N first parameters being used for controlling a display effect of the image of the first application, the N first parameters including the M first parameters, the N being greater than or equal to the M; and determining, based on the image parameter indicated by the adjustment ability of the image parameter includes the M second parameters, the M first parameters respectively corresponding to the M second parameters and the image of the first application as the first data.

In some embodiments, the server 600 further includes an adjustment unit. The adjustment unit is configured to:

based on the image parameter indicated by the adjustment ability of the image parameter do not include K second parameters respectively corresponding to K first parameters, based on the K first parameters, adjust the image of the first application to obtain an adjusted image; and the adjusted image as the first data, the N first parameters including the K first parameters, K>1.

In some embodiments of the disclosure, the obtaining unit 610 is further configured to:

query the N first parameters matching the first application identifier in a database, the database including at least one identifier and the N first parameters corresponding to each identifier, the at least one identifier including the first application identifier.

In some embodiments of the disclosure, the server 600 further includes a determining unit. The determining unit is configured to:

performing the following processing on each third parameter of the M second parameters, respectively:

based on an adjustment range of the third parameter is a numerical interval, and a target adjustment range corresponding to the third parameter is different from the adjustment range of the third parameter, converting a parameter value of the first parameter corresponding to the third parameter into the parameter value corresponding to the third parameter in the adjustment range of the third parameter to obtain a new first parameter corresponding to the third parameter, and determining the new first parameter and the first application image as the first data, the target adjustment range being the range preset by the cloud server to determine the adjustment ability of the image parameters in the terminal device; and based on the adjustment range of the third parameter is not a numerical interval, or the target adjustment range corresponding to the third parameter is the same as the adjustment range of the third parameter, determining the first parameter corresponding to the third parameter and the image of the first application as the first data directly.

In some embodiments of the disclosure, the obtaining unit 610 is further configured to:

transmit an adjustment ability request to the terminal device, the adjustment ability request being used for requesting the terminal device to query the image parameter capable of being adjusted in the N image parameters, the adjustment ability request including the N image parameters corresponding to the N target adjustment ranges, and the interfaces of N image parameters, N≥1; the N image parameters including the M second parameters, and the target adjustment range is the range preset by the cloud server to determine the adjustment ability of the image parameters in the terminal device; and receive the adjustment ability of N image parameters transmitted by the terminal device.

In some embodiments of the disclosure, the first application is a cloud gaming application.

In some embodiments of the disclosure, the N image parameters include at least one of the following:

a brightness parameter, a chroma parameter, a contrast parameter, a sharpness parameter, a high dynamic range HDR ability parameter, a sharpening parameter, an image noise reduction parameter, a gamma parameter, and a color temperature parameter.

Apparatus embodiments and method embodiments may correspond to each other, and similar descriptions may refer to the method embodiments. To avoid repetition, it is not be repeated here. In an actual application, the terminal device 500 and the server 600 may correspond to the corresponding subject performed by the method 200 and the method 400 of the embodiment of the disclosure, and each unit of the terminal device 500 and the server 600 is to implement the corresponding process in the method 200 and the method 400 respectively. For the sake of brevity, it is not repeated here.

Each unit of the terminal device 500 and server 600 involved in the embodiment of the disclosure may be individually or completely combined into one or several other units, or one (some) of the units may also be divided into several smaller units, which may implement the same operation without affecting the implementation of the technical effect of the embodiment of the disclosure. The foregoing units are divided based on logical functions. In an actual application, a function of one unit may be implemented by multiple units, or functions of multiple units are implemented by one unit. In another embodiment of the disclosure, the terminal device 500 and the server 600 may also include other units. In the actual application, these functions may also be cooperatively implemented by another unit and may be cooperatively implemented by multiple units. According to another embodiment of the disclosure, the terminal device 500 and the server 600 involved in the embodiment of the disclosure may be constructed by running a computer program (including a program code) capable of executing the operations involved in the corresponding method on a general-purpose computing apparatus in a general-purpose computer, which includes, for example, processing elements and storage elements such as a Central Processing Unit (CPU), a Random Access Storage Medium (RAM), and a Read-only Storage Medium (ROM), and the image display method in the embodiment of the disclosure is implemented. The computer program may be recorded on, for example, a computer-readable storage medium, and may be loaded into the electronic apparatus through the computer-readable storage medium, and run in the electronic device to implement the corresponding method in the embodiment of the disclosure.

In other words, the units involved above may be implemented in hardware form, in software form of instructions, or in a combination of hardware and software. In an actual application, each operation of the method embodiment in the disclosure may be completed by the integrated logic circuit of the hardware in the processor and/or the instructions in the form of software, and the operation in combination with the method disclosed by the embodiment of the disclosure may be directly embodied as the completion of the execution of the hardware decoding processor, or the completion of the combination of hardware and software in the decoding processor. In some embodiments, the software may be located in RAM, flash memory, read-only memory, programmable read-only memory, electrically erasable programmable memory, registers and other mature storage media in the field. The storage medium is located in the memory. The processor reads information in the memory and completes the operations in the method embodiment above in combination with hardware thereof.

Figure 11:
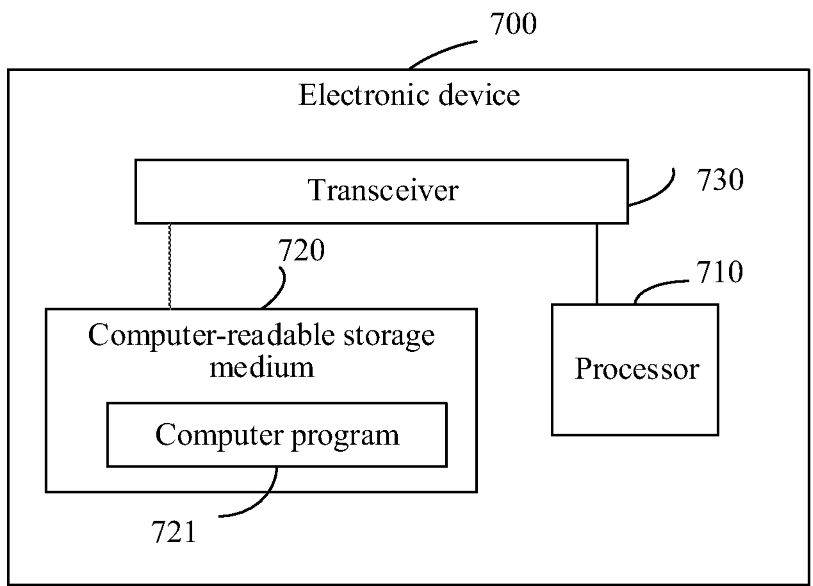
FIG. 11 is a schematic structural diagram of an electronic device according to some embodiments of the disclosure.

FIG. 11 is a schematic structural diagram of an electronic device 700 according to some embodiments of the disclosure.

As shown in FIG. 11, the electronic device 700 at least includes a processor 710 and a computer-readable storage medium 720. The processor 710 and the computer-readable storage medium 720 may be connected by a bus or other means. The computer-readable storage medium 720 is configured to store the computer program 721. The computer program 721 includes computer instructions, and the processor 710 is configured to execute computer instructions stored in the computer-readable storage medium 720. The processor 710 is a computing core and a control core of the electronic device 700, which is applied for implementing one or more computer instructions, loading and executing one or more computer instructions to implement the corresponding method flow or corresponding functions.

For example, the processor 710 may be also known as a Central Processing Unit (CPU). The processor 710 may include but is not limited: a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components, etc.

For example, the computer-readable storage medium 720 may be a high-speed RAM memory, or a non-volatile memory, for example, at least one magnetic disk memory. In an actual application, the computer-readable storage medium may also be at least one computer readable storage mediums distant from the processor 710. In an actual application, the computer-readable storage medium 720 includes, but not limited to: a volatile memory and/or a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) serving as an external cache. Through exemplary but not limited description, RAMs in many forms, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synch Link DRAM (SLDRAM), and a Direct Rambus RAM (DRRAM), are available.

In one implementation, the electronic device 700 may be the terminal device 500 and the server 600 as shown in FIG. 9 and FIG. 10. Computer instructions are stored in the computer-readable storage medium 720. The processor 710 loads and executes the computer instructions stored in the computer-readable storage medium 720 to implement the corresponding operations in the method embodiment shown in FIG. 5 and FIG. 8. In an actual application, the computer instructions in the computer-readable storage medium 720 are loaded and the corresponding operations are executed by the processor 710. To avoid repetition, it is not be repeated here.

The embodiment of the disclosure also provides a computer-readable storage medium (memory), and the computer-readable storage medium is a memory device in electronic device 700 for storing programs and data. For example, the computer-readable storage medium 720. It may be understood that the computer-readable storage medium 720 here may include an internal memory of the electronic device 700, and may also include an expanded memory supported by the electronic device 700. The computer-readable storage medium provides a storage space, and the storage space stores an operating system of the electronic device 700. Also, the storage space also stores one or more computer instructions applied to be loaded and executed by the processor 710, which may be one or more computer programs 721 (including program code).

The electronic device 700 further includes: a transceiver 730, and the transceiver 730 may be connected to the processor 710 or the computer-readable storage medium 720.

The computer-readable storage medium 720 may control the transceiver 730 to communicate with other devices, in an actual application, may transmit information or data to other devices, or receive information or data from other devices. The transceiver 730 may include a transmitter and a receiver. The transceiver 730 may further include antennas, which may be one or more in number.

The embodiments of the disclosure provide a computer program product or a computer program, the computer program product or the computer program including a computer instruction stored in a computer-readable storage medium. For example, the computer program 721. At this point, the electronic device 700 may be a computer, the processor 710 reads the computer instructions from the computer-readable storage medium 720, and the processor 710 executes the computer instructions, causing the computer to perform the image display method provided in the various optional modes described above.

In other words, when software is used for implementation, implementation may be entirely or partially performed in the form of a computer program product. The computer program product includes one or more computer instructions. When the computer program instructions are loaded and executed on the computer, all or partly run a flow of the embodiments of the disclosure or implement functions of the embodiments of the disclosure. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a Digital Subscriber Line (DSL)) or wireless (for example, infrared, wireless or microwave) manner.

A person skilled in the art may notice that the exemplary units and algorithm operations described with reference to the embodiments disclosed in this specification can be implemented in electronic hardware, or a combination of computer software and electronic hardware. Whether these functions are implemented in hardware or software depends on the specific application and design constraints of the technical solution. A person skilled in the art may use different methods to implement the described functions for each specific application, but such implementation may not be considered beyond the scope of the disclosure.

The foregoing descriptions are merely implementations of the disclosure, but are not intended to limit the protection scope of the disclosure. Any variation or replacement readily figured out by a person skilled in the art within the technical scope disclosed in the disclosure falls within the protection scope of the disclosure. Therefore, the protection scope of the disclosure is subject to the protection scope of the claims.

What is claimed is:

1. An image display method for flexibly applying display effects, to images of different applications being displayed on a terminal device, that are adapted to the different applications and capabilities of the terminal device, the image display method comprising:

obtaining adjustment capability information of the terminal device indicating whether the terminal device is capable of adjusting the image of an application with at least one display effect within at least one adjustment range;

obtaining first data comprising M first parameters for adjusting the at least one display effect, where M is a number greater than or equal to 1;

adjusting parameter values of P second parameters within adjustment ranges of the terminal device based on the adjustment capability information indicating that the terminal device can adjust the parameter values of the P second parameters within the adjustment ranges, and wherein the adjustment ranges of the terminal device comprise the parameter values of the M first parameters, where P is a number less than or equal to M;

displaying the image with the at least one display effect being applied in accordance with the parameter values of N second parameters, wherein an adjustment range of the M second parameters includes the parameter values of the M first parameters; and based on the adjustment capability information indicating that the terminal device is incapable of adjusting K parameters, displaying an image received from a cloud server that is adjusted based on the K parameters.

2. The image display method according to claim 1, wherein the obtaining the first data comprises:

transmitting a first request to the cloud server, the first request being used to request to obtain the first data of the image of the application; and receiving the first data from the cloud server.

3. The image display method according to claim 2, wherein the first request includes an application identifier associated with the application.

4. The image display method according to claim 1, wherein the obtaining the adjustment capability information comprises:

receiving, from the cloud server, an adjustment capability request to determine image parameters capable of being adjusted from among the N second parameters; and obtaining, based on the adjustment capability request, the adjustment capability information of the image parameter in the terminal device, and wherein the image display method further comprises transmitting the adjustment capability information of the image parameter to the cloud server.

5. The image display method according to claim 4, wherein the adjustment capability request comprises N target adjustment ranges corresponding to the N second parameters, respectively, and interfaces of the N second parameters, wherein the N second parameters comprise the P second parameters, and N being greater than or equal to P; and wherein the obtaining the adjustment capability information comprises:

based on the adjustment capability request, performing processing on each third parameter in the N second parameters, respectively, wherein the processing comprises:

calling an interface of the third parameter to determine an adjustment range of the third parameter;

based on the adjustment range of the third parameter being a numerical interval, determining that the third parameter is the image parameter capable of being adjusted in the terminal device;

based on the adjustment range of the third parameter not being the numerical interval, and based on the adjustment range of the third parameter comprising a target adjustment range corresponding to the third parameter, determining that the third parameter is the image parameter capable of being adjusted in the terminal device; and based on the adjustment range of the third parameter not being the numerical interval, and the adjustment range of the third parameter not including the target adjustment range corresponding to the third parameter, determining that the third parameter is an image parameter incapable of being adjusted in the terminal device.

6. The image display method according to claim 5, wherein transmitting the adjustment capability request of the image parameter to the cloud server comprises:

for each third parameter in the N second parameters, based on the third parameter being the image parameter capable of being adjusted in the terminal device, the adjustment range of the third parameter being the numerical interval, and the adjustment range of the third parameter being different from the target adjustment range corresponding to the third parameter, transmitting the adjustment range of the third parameter to the cloud server.

7. The image display method according to claim 5, wherein the calling the interface of the third parameter comprises:

determining whether the interface of the third parameter exists;

based on the interface of the third parameter existing, calling the interface of the third parameter to obtain the adjustment range of the third parameter; and based on no interface of the third parameter existing, determining that the adjustment range of the third parameter is null.

8. The image display method according to claim 5, wherein the N second parameters include at least one of the following: a brightness parameter, a chroma parameter, a contrast parameter, a sharpness parameter, a high dynamic range HDR capability parameter, a sharpening parameter, an image noise reduction parameter, a gamma parameter, or a color temperature parameter.

9. The image display method according to claim 1, wherein the M first parameters include at least one of: brightness, contrast, and chroma.

10. The image display method according to claim 9, wherein the P second parameters include at least one of clarity, high dynamic range capability, image sharpening, image noise reduction, gamma, and color temperature.

11. An image display apparatus for flexibly applying display effects, to images of different applications being displayed on a terminal device, that are adapted to the different applications and capabilities of the terminal device, comprising:

at least one non-transitory memory containing program code; and at least one processor configured to execute the program code, the program code comprising:

first obtaining code configured to cause at least one of the at least one processor to obtain adjustment capability information of the terminal device indicating whether the terminal device is capable of adjusting the image of an application with at least one display effect within at least one adjustment range;

second obtaining code configured to cause at least one of the at least one processor to, obtain first data comprising M first parameters for adjusting the at least one display effect, where M is a number greater than or equal to 1;

adjustment code configured to cause at least one of the at least one processor to adjust parameter values of P second parameters within adjustment ranges of the terminal device based on the adjustment capability information indicating that the terminal device can adjust the parameter values of the P second parameters within the adjustment ranges, and wherein the adjustment ranges of the terminal device comprise the parameter values of the M first parameters, where P is a number less than or equal to M; and display code configured to cause at least one of the at least one processor to:

display the image with the at least one display effect being applied in accordance with the parameter values of N second parameters, wherein an adjustment range of the M second parameters includes the parameter values of the M first parameters; and based on the adjustment capability information indicating that the terminal device is incapable of adjusting K parameters, display an image received from a cloud server that is adjusted based on the K parameters.

12. The image display apparatus according to claim 11, wherein the program code further comprises:

transmitting code configured to cause at least one of the at least one processor to transmit a first request to the cloud server, the first request being used to obtain the first data of the image of the application; and receiving code configured to cause at least one of the at least one processor to receive the first data from the cloud server.

13. The image display apparatus according to claim 12, wherein the first request includes an application identifier associated with the application.

14. The image display apparatus according to claim 11, wherein the first obtaining code is configured to cause at least one of the at least one processor to:

receive, from the cloud server, an adjustment capability request to determine image parameters capable of being adjusted from among the N second parameters; and obtain, based on the adjustment capability request, the adjustment capability information of the image parameter in the terminal device, and wherein the program code further comprises transmitting code configured to cause at least one of the at least one processor to transmit the adjustment capability information of the image parameter to the cloud server.

15. The image display apparatus according to claim 14, wherein the adjustment capability request comprises N target adjustment ranges corresponding to the N second parameters, respectively, and interfaces of the N second parameters, wherein the N second parameters comprise the P second parameters, and N being greater than or equal to P, and wherein the first obtaining code is configured to cause at least one of the at least one processor to:

perform processing, based on the adjustment capability request, on each third parameter in the N second parameters, respectively, wherein the processing comprises:

calling an interface of the third parameter to determine an adjustment range of the third parameter;

based on the adjustment range of the third parameter being a numerical interval, determining that the third parameter is the image parameter capable of being adjusted in the terminal device;

based on the adjustment range of the third parameter not being the numerical interval, and based on the adjustment range of the third parameter comprising a target adjustment range corresponding to the third parameter, determining that the third parameter is the image parameter capable of being adjusted in the terminal device; and based on the adjustment range of the third parameter not being the numerical interval, and the adjustment range of the third parameter not including the target adjustment range corresponding to the third parameter, determining that the third parameter is an image parameter incapable of being adjusted in the terminal device.

16. The image display apparatus according to claim 15, wherein the transmitting code is configured to cause at least one of the at least one processor to:

for each third parameter in the N second parameters, based on the third parameter being the image parameter capable of being adjusted in the terminal device, the adjustment range of the third parameter being the numerical interval, and the adjustment range of the third parameter being different from the target adjustment range corresponding to the third parameter, transmit the adjustment range of the third parameter to the cloud server.

17. The image display apparatus according to claim 15, wherein to call the interface of the third parameter, the processing further comprises:

determining whether the interface of the third parameter exists;

based on the interface of the third parameter existing, calling the interface of the third parameter to obtain the adjustment range of the third parameter; and based on no interface of the third parameter existing, determining that the adjustment range of the third parameter is null.

18. The image display apparatus according to claim 11, wherein the M first parameters include at least one of: brightness, contrast, and chroma.

19. The image display apparatus according to claim 18, wherein the P second parameters include at least one of clarity, high dynamic range capability, image sharpening, image noise reduction, gamma, and color temperature.

20. A non-transitory computer-readable storing instructions for flexibly applying display effects, to images of different applications being displayed on a terminal device, that are adapted to the different applications and capabilities of the terminal device, that, when executed by at least one processor, cause the at least one processor to:

obtain adjustment capability information of an image parameter in a terminal device, wherein the adjustment capability information of the terminal device indicating whether the terminal device is capable of adjusting the image of an application with at least one display effect within at least one adjustment range;

obtain first data comprising M first parameters for adjusting the at least one display effect, where M is a number greater than or equal to 1;

adjust parameter values of P second parameters within adjustment ranges of the terminal device based on the adjustment capability information indicating that the terminal device can adjust the parameter values of the P second parameters within the adjustment ranges, and wherein the adjustment ranges of the terminal device comprise the parameter values of the M first parameters, where P is a number less than or equal to M;

display the image with the at least one display effect being applied in accordance with the parameter values of N second parameters, wherein an adjustment range of the M second parameters includes the parameter values of the M first parameters; and based on the adjustment capability information indicating that the terminal device is incapable of adjusting K parameters, display an image received from a cloud server that is adjusted based on the K parameters.

* * * * *